(12) United States Patent
Wilson et al.

(10) Patent No.: US 9,567,756 B2
(45) Date of Patent: Feb. 14, 2017

(54) BACKING LAYERS FOR FLOOR COVERINGS

(75) Inventors: Gary Wilson, Coventry (GB); Steven Lawrence, Coventry (GB)

(73) Assignee: The Amtico Company Limited (GB)

(\*) Notice: Subject to any disclaimer, the term of this patent is extended or adjusted under 35 U.S.C. 154(b) by 417 days.

(21) Appl. No.: 13/877,728

(22) PCT Filed: Oct. 5, 2011

(86) PCT No.: PCT/GB2011/051899
§ 371 (c)(1),
(2), (4) Date: Oct. 22, 2013

(87) PCT Pub. No.: WO2012/046051
PCT Pub. Date: Apr. 12, 2012

(65) Prior Publication Data
US 2014/0044936 A1    Feb. 13, 2014

Related U.S. Application Data

(60) Provisional application No. 61/504,951, filed on Jul. 6, 2011.

(30) Foreign Application Priority Data

Oct. 6, 2010 (GB) ................... 1016795.5

(51) Int. Cl.
*B32B 3/10*   (2006.01)
*E04F 15/10*  (2006.01)
(Continued)

(52) U.S. Cl.
CPC ............... *E04F 15/107* (2013.01); *B32B 5/16* (2013.01); *B32B 27/08* (2013.01); *B32B 27/20* (2013.01);
(Continued)

(58) Field of Classification Search
CPC ....................................... E04F 15/107
See application file for complete search history.

(56) References Cited

U.S. PATENT DOCUMENTS 4,247,364 A   1/1981 Culp
6,103,044 A   8/2000 Harwood et al.
(Continued)

FOREIGN PATENT DOCUMENTS

CN    101113637 A    1/2008
JP    2009249848 A   10/2009
(Continued)

OTHER PUBLICATIONS

Zweifel et al., "Plastics Additives Handbook", Wageningen UR Library, 2001, pp. 903-906 and 924-930.
(Continued)

*Primary Examiner* — Christopher Polley
(74) *Attorney, Agent, or Firm* — Burns & Levinson LLP; Joseph M. Maraia

(57) ABSTRACT

The present invention relates to a backing film for a resilient floor covering comprising (a) a first layer and (b) a second layer, wherein the first layer contains a first filler in an amount of from 10 to 80% by weight and the second layer contains a second filler in an amount of from 10 to 80% by weight and wherein the first filler is a platelet type filler.

14 Claims, 1 Drawing Sheet

(51) Int. Cl.
  *B32B 27/20* (2006.01)
  *B32B 27/30* (2006.01)
  *B32B 5/16* (2006.01)
  *B32B 27/08* (2006.01)

(52) U.S. Cl.
  CPC ............ *B32B 27/304* (2013.01); *E04F 15/10* (2013.01); *B32B 2250/02* (2013.01); *B32B 2250/03* (2013.01); *B32B 2250/24* (2013.01); *B32B 2264/101* (2013.01); *B32B 2264/102* (2013.01); *B32B 2264/104* (2013.01); *B32B 2264/108* (2013.01); *B32B 2419/04* (2013.01); *B32B 2471/00* (2013.01); *Y10T 428/24851* (2015.01); *Y10T 428/25* (2015.01); *Y10T 428/251* (2015.01); *Y10T 428/256* (2015.01)

(56) References Cited

U.S. PATENT DOCUMENTS 6,861,128 B1* 3/2005 Muller ............ B29C 45/14811
    428/156
2001/0034983 A1* 11/2001 Fanti ........................ B32B 3/14
    52/177

FOREIGN PATENT DOCUMENTS

WO    9718939 A1    5/1997
WO    9718949 A1    5/1997

OTHER PUBLICATIONS

Zhao, Y. et al. Plastic Profile Production Technique and Application Examples. Chemistry Industry Press, Mar. 2006: 75-76.

* cited by examiner

_US 9,567,756 B2_

BACKING LAYERS FOR FLOOR COVERINGS

FIELD OF INVENTION

The present invention relates to resilient floor coverings and methods of making such floor coverings. The invention is concerned in particular with the backing layers for resilient floor coverings and methods of making such backing layers.

BACKGROUND

Resilient floor coverings, which include for example vinyl tiles and vinyl sheet, are well known. There are described for example in an article entitled "Flooring Materials" in Encyclopaedia of Polymer Science and Engineering, Wiley-Interscience, Volume 7 (1987), pages 233-247.

Such floor coverings, as described in the above article, are composite materials. The uppermost film, which is commonly called the wear layer, is formulated for good resistance to abrasion and wear. The undermost film of the composite is commonly referred to as the backing film and may comprise one or more backing layers. A printed patterned film is generally interposed between the wear layer and a first backing layer.

The backing layer is generally a highly filled thermoplastic material. The compositions of all of the layers in the composite must be balanced to ensure that the floor covering has the correct properties, for example insulating and sound absorbing properties, and in particular freedom from a tendency to curl. Economic factors must also be borne in mind.

In the manufacture of resilient floor coverings, films, including the backing layers, are commonly made by techniques such as calendaring, extrusion and spread coating.

In the field of resilient floor coverings, as in all consumer led fields, there is a constant drive to provide high quality products at ever lower prices. Manufacturers can reduce costs as far as possible by negotiations with suppliers and looking carefully at their production processes but there may also be changes to products that can be made to reduce the cost of the product itself.

In the field of resilient floor coverings increasing the level of filler in one or more of the films of the product can greatly reduce the cost of producing the product. However, increasing levels of filler has associated problems that must be considered, for example high filler levels can introduce curl into the final product and can affect the dimensional stability of the film and the end product. There can also be problems in actual manufacture of the film as high filler levels can result in processing problems, whether calendaring, extruding or spread coating.

In the field of floor coverings manufactured using plastisol processes it is simpler to insert a fibrous scrim between the printed patterned film and a highly filled backing film. The scrim allows the use of a highly filled, and therefore cheaper, backing film without any adverse effect on the curl and dimensional stability of the end product.

However, the use of a scrim in a calendaring, extrusion or spread coating process would add further steps and cost to the production of the product and gives fewer advantages in this particular production method. There therefore remains a need for a way to both reduce the cost and negate curl in resilient floor coverings, particularly those manufactured by a calendaring, extrusion or spread coating process.

SUMMARY

Accordingly the present invention provides a backing film for use in a resilient floor covering comprising at least a wear layer and a backing film, the backing film comprising (a) a first layer and (b) a second layer, wherein the first layer contains a first filler in an amount of from 10 to 80% by weight and the second layer contains a second filler in an amount of from 10 to 80% by weight and wherein the first filler is a platelet type filler and in use the first layer is positioned closer to the wear layer of the resilient floor covering than the second layer.

In one embodiment the first filler is a platelet type filler and the second filler is a non-platelet type filler.

Suitable platelet fillers include but are not limited to kaolin, talc, mica and graphite.

Suitable non-platelet fillers include but are not limited to calcium carbonate (for example chalk and limestone), dolomite, magnesium hydroxide, ATH, magnesium, carbonate, calcium sulphate, $SiO_2$, Feldspar and glass beads.

The first layer of the backing film may be the layer positioned closest to the wear layer. Alternatively the first layer of the backing film may be positioned separated from the wear layer of the floor covering in use by a printed patterned film.

There is a benefit in having a non-platelet filler in the second layer and a platelet filler in the first layer, in particular when the first layer is the layer of the backing film positioned closest to the wear layer of the floor covering in use. Non-platelet fillers are generally cheap. The use of a platelet filler, particularly in the first layer when this is positioned close to the wear layer is that the potential problem of curling, which would arise if the filler in all layers of the backing film was non-platelet, is overcome. Previously due to the curling that would happen with non-platelet filler in all layers of the backing film the filler level in layers other than that positioned closest to the wear layer would have had to be kept to a minimum, and certainly less than the filler level of the layer closest to the wear layer which increases cost.

The addition of the platelet filler adds a layer of reduced thermal movement compared to the layers above and below, for example, the wear layer and the non-platelet filled back layer. The difference in thermal movement/stability of this layer in between the other two gives a "layflat" product.

The first filler may be present in an amount of from 15 to 75, 20 to 70, 25 to 65, 30 to 60, 35 to 55, 40 to 50, 42 to 48 weight %, for example 45 weight %.

The second filler may be present in an amount of from 15 to 75, 20 to 70, 25 to 65, 30 to 70, 35 to 65, 40 to 65, for example 45, 55 to 65 weight %, for example 60 weight %.

The first filler may be present in an amount of from 15 to 75, 20 to 70, 25 to 65, 30 to 60, 35 to 55, 40 to 50, 42 to 48 weight %, for example 45 weight % by weight of the first layer.

The second filler may be present in an amount of from 15 to 75, 20 to 70, 25 to 65, 30 to 70, 35 to 65, 40 to 65, for example 45, 55 to 65 weight %, for example 60 weight % by weight of the second layer.

The first layer and the second layer may independently comprise any suitable plastics composition, for example a suitable thermoplastic polymer composition, vinyl, ethylene methacrylate (EMA), ethylene vinyl acetate (EVA), or any other olefinic polymers, for example polyurethane (PU) or acrylonitrile butadiene styrene (ABS).

The polymer composition used in each of the first and second layers may be the same or different.

The first layer may also comprise one or more non-platelet type fillers. One or more of the non-platelet type fillers may be granular or spherical in shape. The one or more non-platelet type fillers may be present in a total amount of 1-10 weight %, for example 3 to 8 weight %, of the first layer.

The amount of platelet filler combined with any additional filler in the first layer and the amount of second filler in the second layer may be similar or the same in terms of weight percent based on the weight of the layer of the backing film in question.

The amount of platelet filler combined with any additional filler in the first layer may be less than the amount of second filler in the second layer in terms of weight percent based on the weight of the layer of the backing film in question.

The first layer and the second layer may comprise any other suitable materials. The first layer and the second layer may additionally comprise suitable amounts of lubricants, antioxidants and stabilisers and plasticisers.

In a backing film of the present invention the first backing film may have a thickness of from 200 to 500 microns, more preferably 250 to 450, 300 to 400, most preferably 320 to 340, for example 330 microns.

In a backing film of the present invention the second backing film may have a thickness of from 1280 to 1580 microns, more preferably 1320 to 1520, 1380 to 1480, most preferably 1430 to 1470, for example 1450 microns.

The backing film of the present claimed invention may be manufactured using conventional co-extrusion, calendaring and spread coating equipment and processes.

The present invention further provides a composite laminate resilient floor covering characterised in that it comprises at least one backing film of the invention.

The present invention further provides a floor tile characterised in that it comprises at least one backing film of the invention.

BRIEF DESCRIPTION OF DRAWINGS

The invention will now be described with regard to the accompanying drawing, in which.

DETAILED DESCRIPTION

Figure 1A:
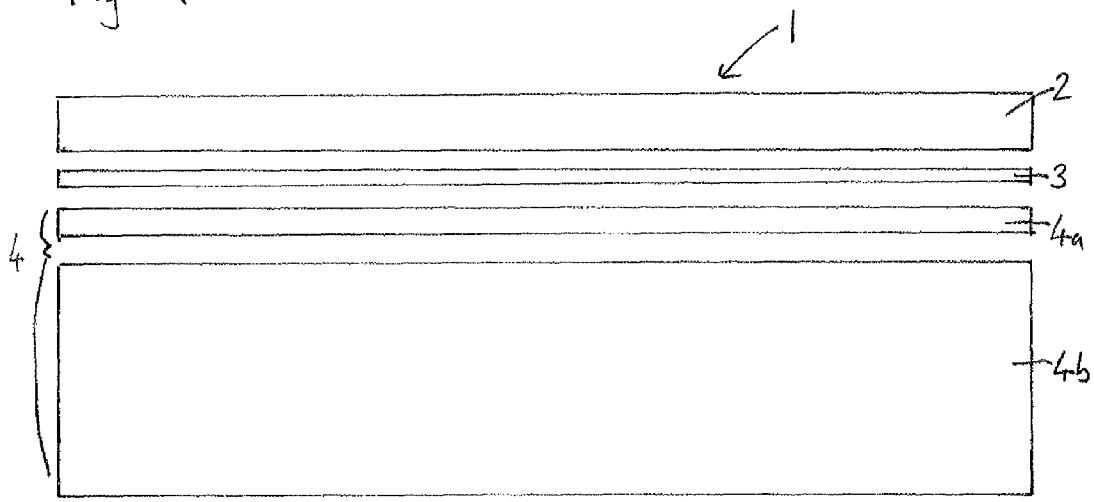
FIGS. 1a and 1b are cross sections of a tile or portion of a floor covering having a backing film according to the present invention, showing the separate films and layers and the laminated form respectively.
Figure 1B:
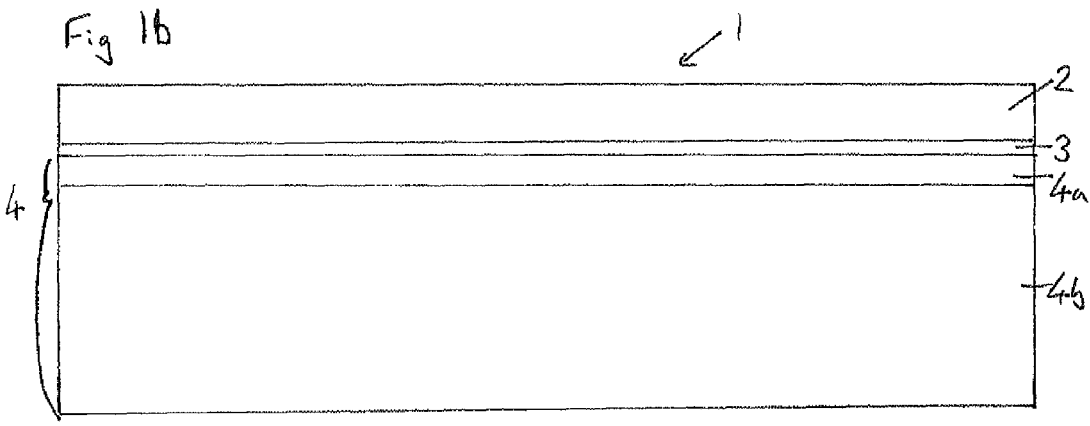

FIGS. 1a and 1b illustrate a floor tile or a portion of a floor covering 1 having a wear layer 2, a decorative layer in the form of a printed patterned film 3 positioned beneath the wear layer 2. There is positioned beneath the printed patterned film 3 a backing film 4 in accordance with the present invention. The backing film 4 comprises a first layer 4a, positioned immediately beneath the printed patterned layer and therefore forming the face ply, and a second layer 4b, positioned beneath the first layer and therefore forming the undermost layer of the floor covering.

Example

A floor tile or a portion of a floor covering containing a backing film in accordance with the present invention and of the composition as described in FIGS. 1 and 1a may have the following composition (% by weight) and thickness: Wear Layer—thickness of 521 microns. The wear layer comprises 76% PVC, 22% plasticiser and 2% stabilizer for UV and heat. Print Design Film—thickness of 75 microns. First backing layer—thickness 330 micron. The first backing layer comprises 42% PVC, 12% plasticiser, 1% stabiliser (heat) and 45% platelet filler, for example clay. Second backing Layer—thickness 1450 microns. The second backing layer comprises 42% PVC, 12% plasticiser, 1% stabiliser (heat) and 45% non-platelet filler, for example chalk.

The invention claimed is:

1. A backing film for use in a resilient floor covering comprising at least a wear layer and a backing film, the backing film comprising:
   (a) first layer; and
   (b) a second layer,
      wherein the first layer contains a platelet type filler in an amount of from 30 to 80% by weight and the second layer contains a non-platelet type filler in an amount of from 10 to 80% by weight,
      wherein the first layer is positioned closer to the wear layer of the resilient floor covering than the second layer,
      wherein the non-platelet type filler is also present in an amount of 1-3% by weight in the first layer, and
      wherein a combined amount of platelet type and any additional filler in the first layer is less than or the same as the amount of non-platelet type filler in the second layer in terms of weight percentage based on the weight of the respective layer.

2. The backing film according to claim 1 wherein the platelet type filler comprises kaolin, talc, mica or graphite.

3. The backing film according to claim 1 wherein the non-platelet type filler comprises calcium carbonate, dolomite, magnesium hydroxide, ATH, magnesium, carbonate, calcium sulphate, $SiO_2$, Feldspar or glass beads.

4. The backing film according to claim 1 wherein the platelet type filler is present in an amount of from 30 to 65 weight % of the first layer.

5. The backing film according to claim 1 wherein the non-platelet type filler is present in an amount of from 20 to 70 weight % of the second layer.

6. The backing film according to claim 1 wherein the first layer and the second layer independently comprise a thermoplastic polymer composition, vinyl, ethylene methacrylate (EMA), ethylene vinyl acetate (EVA), polyurethane (PU) or acrylonitrile butadiene styrene (ABS) or any other olefinic polymer.

7. The backing film according to claim 1 wherein the first layer of the backing film has a thickness of from 200 to 500 microns.

8. The backing film according to claim 1 wherein the second layer of the backing film has a thickness of from 1280 to 1580 microns.

9. A composite laminate resilient floor covering comprising:
   at least one backing film, wherein the at least one backing film comprises:
   at least a wear layer; and
   (a) first layer; and
   (b) a second layer,
      wherein the first layer contains a platelet type filler in an amount of from 30 to 80% by weight and the second layer contains a non-platelet type filler in an amount of from 10 to 80% by weight, wherein the first layer is positioned closer to the wear layer of the resilient floor covering than the second layer, wherein the non-platelet type filler is also present in an amount of 1-3% by weight in the first layer, and wherein a combined amount of platelet type and any additional filler in the first layer is less than or the same as the amount of non-platelet type filler in the second layer in terms of weight percentage based on the weight of the respective layer.

10. The composite laminate resilient floor covering according to claim 9 wherein the first layer of the backing film is the layer positioned closest to the wear layer.

11. The composite laminate resilient floor covering according to claim 9 wherein the first layer of the backing film is separated from the wear layer of the floor covering by a printed patterned film.

12. A floor tile comprising:
at least one backing film, wherein the at least one backing film comprises:
at least a wear layer; and
a backing film comprising:
(a) first layer; and
(b) a second layer,
wherein the first layer contains a platelet type filler in an amount of from 30 to 80% by weight and the second layer contains a non-platelet type filler in an amount of from 10 to 80% by weight, wherein the first layer is positioned closer to the wear layer of the resilient floor covering than the second layer, wherein the non-platelet type filler is also present in an amount of 1-3% by weight in the first layer, and wherein a combined amount of platelet type and any additional filler in the first layer is less than or the same as the amount of non-platelet type filler in the second layer in terms of weight percentage based on the weight of the respective layer.

13. The floor tile according to claim 12 wherein the first layer of the backing film is the layer positioned closest to the wear layer.

14. The floor tile according to claim 12 wherein the first layer of the backing film is separated from the wear layer by a printed patterned layer.

* * * * *